Oct. 18, 1966　　　　　V. L. NEWHOUSE ETAL　　　　3,280,337
CRYOGENIC OUTPUT TRANSLATION DEVICE UTILIZING HEATING
Filed Aug. 31, 1960　　EFFECTS AND DIFFERENT CRITICAL CURRENTS
　　　　　　　　　　　　　　　　　　　　　　　　3 Sheets-Sheet 1
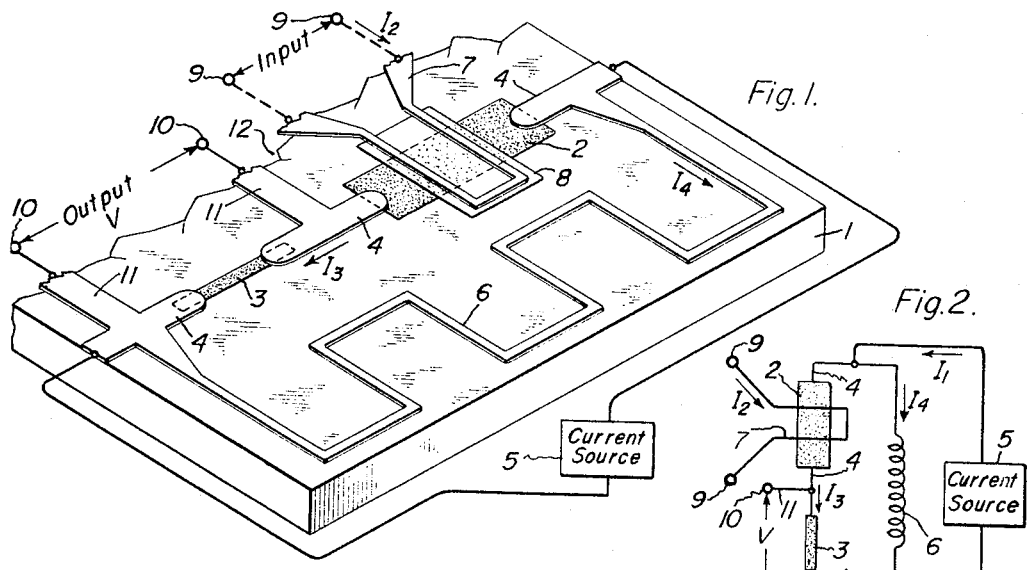
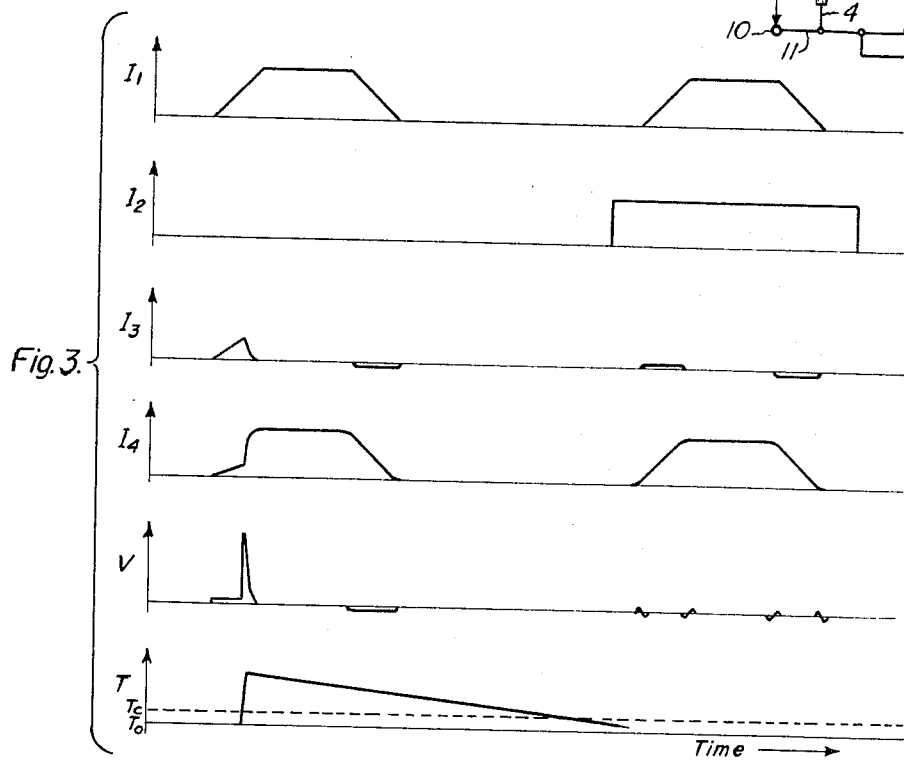
*Inventors:*
*Vernon L. Newhouse ;*
*John W. Bremer ;*
*Harold H. Edwards,*
by *Richard R. Brainard*
*Their Attorney.*

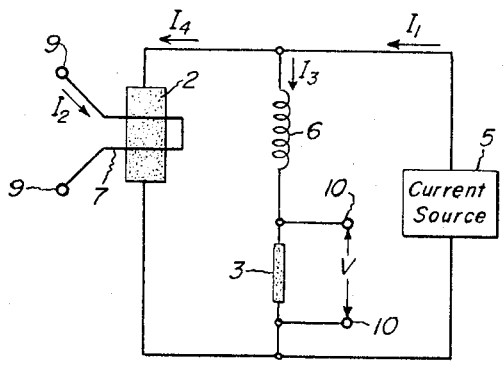
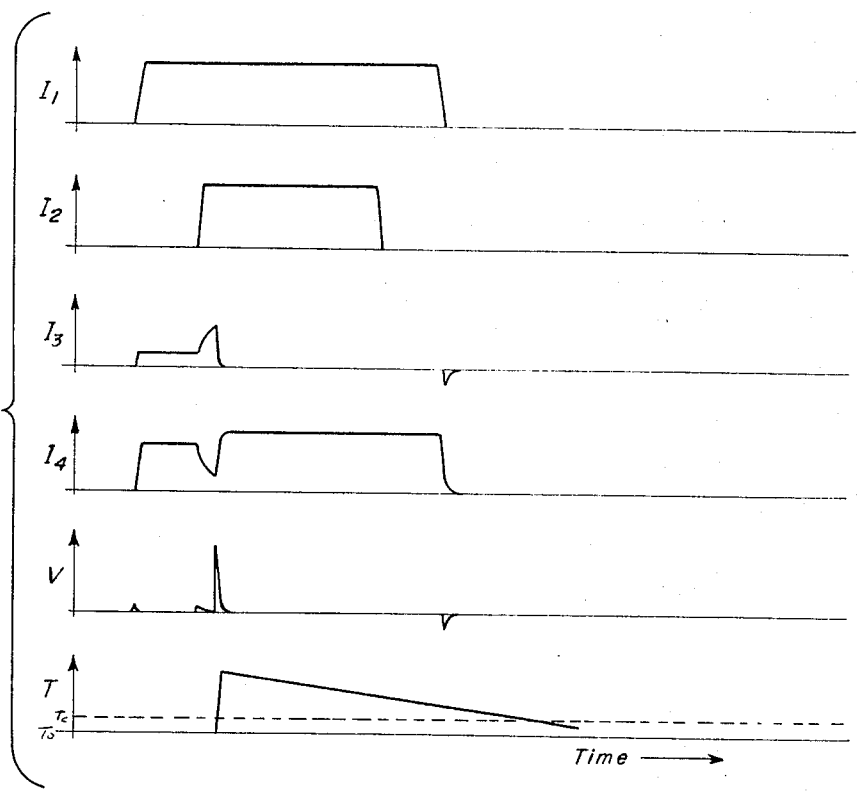

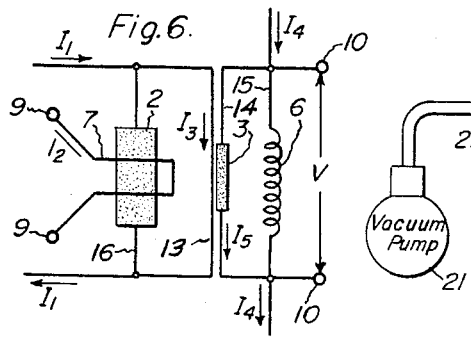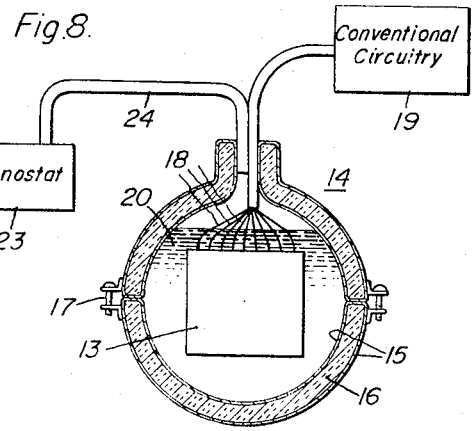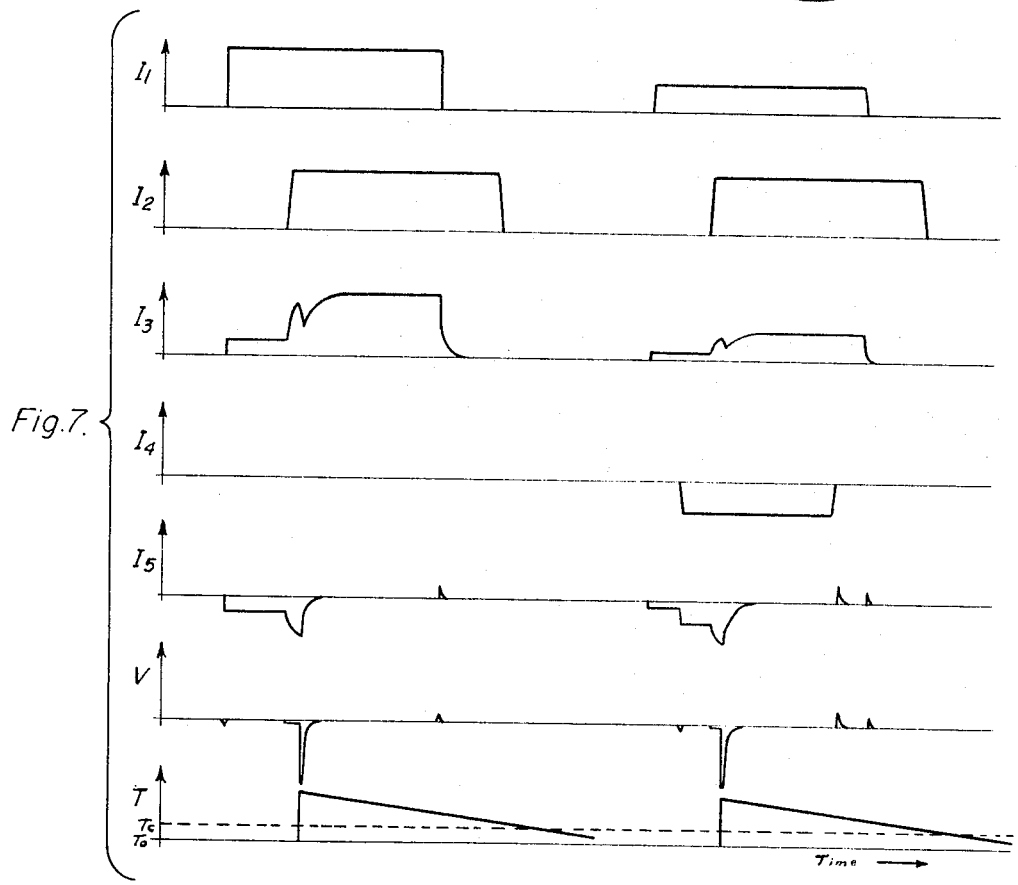

United States Patent Office 3,280,337
Patented Oct. 18, 1966

3,280,337
CRYOGENIC OUTPUT TRANSLATION DEVICE UTILIZING HEATING EFFECTS AND DIFFERENT CRITICAL CURRENTS
Vernon L. Newhouse, Scotia, N.Y., John W. Bremer, Sunnyvale, Calif., and Harold H. Edwards, Schenectady, N.Y., assignors to General Electric Company, a corporation of New York
Filed Aug. 31, 1960, Ser. No. 53,130
15 Claims. (Cl. 307—88.5)

This invention relates to a cryogenic translation device and more particularly to a device for producing a high level signal in response to an occurrence in cryogenic circuitry.

Certain electrical conductors called superconductors are known to exhibit a loss of electrical resistance at supercold temperatures approaching absolute zero and to regain this resistance in the presence of a specified "critical" magnetic field. Various circuit devices called cryogenic devices may be constructed for employing this phenomenon, which include bistable elements switched from one stable state to another by means of an applied magnetic field. A major problem in the adaptation and employment of such cryogenic devices to practical use is the extremely low output voltage thereof, making it difficult to match the devices to other circuitry.

Conventional output couplings from cryogenic circuits frequently involve the use of sensing conductors inductively arranged to detect the presence of a magnetic field caused by current flowing in the cryogenic device. Placement of these sensing conductors is somewhat awkward, however, in that a change in magnetic flux will be detected anywhere along the length of the sensing conductor, and furthermore, no impedance step-up is gained without coiling the sensing conductor in relation to the field of the cryogenic device whose output is to be measured. The latter expedient is cumbersome and somewhat impractical especially in the desirable "printed circuit" type cryogenic circuitry where a multiplicity of conductors and devices are deposited on a common base or substrate.

On the other hand, when an output is taken directly across a cryogenic device rather than inductively, again only low level voltages are available. The generally low shunting resistance of the cryogenic device itself, for example, even when in the non-superconducting or normal state, prevents the development of a high voltage output signal thereacross. Moreover, current in the circuit is conventionally arranged to cease flowing in the cryogenic element when it thus becomes nonsuperconductive or resistive.

It is therefore an object of this invention to provide a translation device for producing a relatively high voltage, high impedance output signal in response to a signal occurrence in a cryogenic circuit or other very low impedance apparatus.

It is another object of this invention to provide a simplified direct coupled output to cryogenic circuitry unshunted by low impedance elements for producing a high voltage output useable by other circuits.

It is another object of this invention to provide a simplified output device for cryogenic circuitry or other low impedance apparatus which may be readily deposited on a common substrate with the apparatus.

In accordance with the present invention a cryogenic translation device is provided wherein the available energy in a low impedance cryogenic circuit is rapidly dissipated as a sharp and relatively large voltage pulse, readily useable by conventional circuits. Current from a relatively constant current source is directed through a superconductive output element in response to a signal condition in the cryogenic circuit. This output element is constructed to have a relatively high resistance when in the normal or non-superconducting state and also has a critical current less than the critical current of conductors between the element and the current source, whereby the critical current of the output element is first exceeded in response to a signal in the circuit. Shortly after its critical current is thus exceeded, the resistance of the element will snap or rise very rapidly from substantially zero resistance to high resistance while attendant heating further aids the spread of resistance and raises the resistance. The constant current, forced through the element, rapidly develops a high voltage thereacross which may be readily utilized as an output to other circuitry.

Critical temperature for a superconductor is defined as that temperature when a certain superconductor becomes superconducting and loses all its resistance, with no current flowing therethrough. Critical current is that current flowing through a superconductor above which the superconductor again becomes resistive, and is a function of temperature.

Other means reduce the current flow through the output element before heating is sufficient to destroy the element. According to one feature of the invention this latter means comprises an alternate current path for diverting the current away from the output element before damage is caused thereto by excessive heating. The alternate current path also provides an initial determination of current flow in the circuit and permits switching of current to the output element in response to a given signal condition.

According to another feature of the invention either the aforementioned alternate path, or the circuit path including the output element, also includes a relatively high impedance so that when a current starts to be diverted away from the output element and through the alternate path, the output element will not be shunted by a signal attenuating impedance. This higher impedance may consist of an inductance, and will therefore have the property of initially diverting current applied across the paths to the current path not including the inductance.

A gating device controlled by an input signal and operatively associated with the path not including the inductance is arranged to divert current back into the higher impedance path according to one feature. This arrangement then provides selective operation and then shunting of the output element.

According to a feature of the invention the output element is formed of a film material which does not in itself have a lower critical current than the leads from the current source but which is proportioned of such small cross-section that a lower critical current as well as a high resistance is achieved thereby. When the critical current is thus reduced by a decrease in cross-sectional size of the output element, rather than the initial selection of a material, the current existing when the output element "snaps" remains higher than it otherwise would have been if the material of lower critical current and temperature for bulk material were chosen. A very thin film output element of deposited lead is very satisfactory in this regard.

The subject matter which we regard as our invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 is a perspective view of one embodiment of the cryogenic translation device according to our invention.

FIG. 2 is a schematic representation of the FIG. 1 device.

FIG. 3 is a chart of waveforms illustrating the operation of the device depicted in FIGS. 1 and 2.

FIG. 4 is a schematic diagram of another embodiment according to the present invention.

FIG. 5 is a chart of waveforms illustrating the operation of the FIG. 4 device.

FIG. 6 is a schematic representation of a third embodiment of the invention.

FIG. 7 is a waveform chart illustrating the operation of the FIG. 6 device.

FIG. 8 is an illustration of components that provide a suitable environment for the cryogenic translation device according to the present invention, and any associated cryogenic circuitry.

Referring to FIG. 1 a glass plate substrate 1 has deposited thereon a number of superconductive circuit elements including a thin film gate 2 and a thin film output element 3 connected in series with a source of relatively constant current 5, by means of deposited conductors 4. Output element 3 is preferably arranged to have a lower critical current than the other conducting elements mentioned and current source 5 is adjusted to deliver more than the critical current of output element 3 without exceeding the critical current of the other elements. An inductance 6, which may take the form of a relatively long, thin and circuitous deposited conductor, is shunted across the series combination of films 2 and 3 to provide an alternate circuit for the constant current from source 5. The shape, and dimensions of inductance 6 are determined by the desired inductance which in turn are governed by its preferred time constant in the circuit as hereinafter set out.

A thin superconductive input grid 7 transversely overlays film 2 being separated therefrom by a thin layer of insulation 8 and is electrically connected at either end thereof to terminals 9 for coupling to a source of input signals. Thin film gating element 2 together with grid 7 disposed thereover operate as switching or gating device for controlling the current in the branch of the circuit including conductors 4 and thin film output element 3. Input current applied to terminals 9 of grid 7 creates a magnetic field circularly around the grid 7. If the magnetic field density of this field exceeds the so-called critical field of thin film gate 2 thereunder, the thin film gate 2 will revert from a superconducting state to a resistive or normal state thereby tending to restrain current flow in the portion of circuit wherein the gate is included. Further details of the construction and operation of this gating device will be found in the copending application of Vernon L. Newhouse and John W. Bremer, serial number 758,474 filed September 2, 1958, now Patent No. 3,076,102, assigned to the assignee of the present invention, and entitled "Cryogenic Electronic Device."

The left-hand edge 12 of glass plate 1 is shown broken away to indicate the possible placement of other cyrogenic circuitry and the like which may be deposited upon glass plate 1. Output terminals 10 are connected across thin film output element 3 by means of deposited conductors 11.

The cross-sectional appearance of the various superconducting layers in FIG. 1 is exaggerated in thickness to illustrate the placement and thickness difference between the various circuit elements. The respective layers may be vacuum deposited in a plurality of steps as films contacting or crossing one another as the construction in FIG. 1 dictates. The glass substrate 1 is then arranged in a vacuum container without a cutout shield in the shape of the particular conductor to be deposited positioned between the glass substrate and a heated molybdenum boat containing the desired material. In this manner, in a specific construction according to the invention, gate 2 is formed of tin and is deposited to a depth of 0.3 micron with a width of approximately 2 millimeters. A 0.4 micron silicon monoxide insulating layer 8 is then laid down over the central portion of gate 2 after which the narrow grid 7 is deposited thereover to a depth of approximately 1 micron, having a width of approximately 30 microns.

Although other materials could be employed, tin and lead are utilized because they exhibit desired differences in superconducting characteristics. For example, the critical temperature for tin is 3.73° K. At 3.5° K., a typical operation temperature for cryogenic circuitry, the transition or critical field at which superconducting tin gate film 2 becomes resistive is approximately 30 oersteds. The critical temperature for lead on the other hand is 7.22° K. At 3.5° K. the critical field for the lead conductors, including grid 7 but not including element 3, is 600 oersteds. It is seen that a large differential exists between the critical fields of gate 2 and grid 7 thereby allowing grid 7 to control the conduction in grid 2 by means of providing a magnetic field larger than the critical field of gate 2. At the same time grid 7 will not itself become nonsuperconducting due to its own field or current, and so forms a satisfactory control element.

Output element 3 should preferably have a lower critical current thna the other circuit elements in series with it and the current source so that it may be first rendered resistive by a current exceeding its critical current delivered by the current source. The ouput element should also provide a relatively high resistance in its nonsuperconductive or normal state to maximize the voltage output secured thereacross. These criteria may be met with various output element constiutent constructions and by forming the other circuit elements of materials having higher inherent critical currents and temperatures, or by selective cross-sectional proportioning of the elements.

Thin film output element 3 is formed in the instant embodiment, for example, of lead deposited to a depth of 0.1 micron being approximately 50 microns in width and 4 mm. long. Then connections 4 and 11 as well as inductance 6, are also formed of lead, and are deposited on the glass substrate to a depth of approximately 1 to 1.5 microns, the connections 4 and 11 having a width of approximately 2 millimeters. Although both output element 3 and the other circuit elements are formed of lead, output element 3 may have a smaller critical current than the other lead conductors because of very small cross-sectional size as hereinafter more fully explained. At 3.6° K. the thin lead film output element of the dimensions which are described above by way of example, will have a critical current of approximately 0.15 ampere, being less than the critical current in any other portion of the circuit. Such output element will also have a high resistivity and therefore a desirably high resistance on the order of 100 ohms at room temperature. The next highest resistance in the device is thin film gate 2 having a resistance of approximately 2 ohms at room temperature.

Conductors 4 overlap either end of the output element for a distance of approximately 1 mm. to provide suitable contact thereto, leaving an output element length of approximately 2 mm. therebetween.

The width of inductance 6 formed of lead is approximately 200 microns while the overall circuitous length of inductance 6 is 40 millimeters, this length as well as the width and depth of the deposit being regulated mainly by the desired circuit time constant as hereinafter set out. It is of course understood that all the specific dimensions and materials set out above are merely by way of example and are not to be taken in a limiting sense.

The FIG. 1 device is re-illustrated schematically in

FIG. 2 and its operation will be further considered in connection with the FIG. 3 waveform chart wherein the following are depicted as a function of time: $I_1$, the preferred form of the current input as derived from a current source 5 and arranged to occur periodically at times coincident with an input signal; $I_2$, the signal input; $I_3$, the current through the portion of the circuit including output element 3; $I_4$, the current through inductance 6; V, the voltage across output element 3; and T, the temperature of output element 3. This embodiment is arranged to deliver an output when $I_2$ is absent.

Referring to FIGURES 1 and 2, a current $I_1$ from current source 5 introduced in the absence of an input signal $I_2$ will divide in inverse proportion to the inductances of the two branches and therefore will nearly all flow in the branch including output element 3, since an inductance is specifically included in the other branch. When this current $I_3$, reaches the critical current of output element 3, a very large voltage output results as follows. When the critical current of output element 3 is exceeded, at least small portions of this output element become "normal" or resistive. The increase in resistance causes these portions of the element to heat up, thereby rendering more of the element resistive, causing the element to heat up further, etc. It has been found then that an initially small area of resistive material in output element 3 very rapidly spreads to the rest of the output element 3 by this process termed "thermal propagation" or "nucleation" caused by Joule heating due to the current. The whole element then very rapidly heats up, rapidly becoming completely resistive. Ideally, the whole element may become resistive at nearly the same time if the critical current of each elemental area is exceeded at the same time. Constant current from source 5 continues to flow through high resistance element 3 for a time, producing a high output pulse with a very fast rise time. Near equilibrium conditions are reached as the element becomes completely normal, i.e., when its resistance is no longer a strongly varying function of temperature but the continued heating of the output element further enhances this voltage value somewhat by further increasing the resistance. The rapid conversion of the output element from a condition of superconduction to a condition of complete high resistance is termed "snapping" and it is this property of the output element which materially contributes to sharp output signal distinctness and its high value according to the present invention. The snapping occurs in a fraction of a microsecond, before shunt circuitry, or other means, diverts the constant current away from the output element.

When the output element snaps, the current from the current source starts to be diverted to the alternate branch including inductance 6, according to one feature of the invention. This diversion is timed to take place before the heat generated in output element 3 is sufficient to destroy the element and is, of course, dependent upon the choice and construction of output element material.

The alternate branch circuit including output element 6 is arranged to have an inductance, which, when taken in combination with the resistance value of output element 3 near its output voltage maximum, will have a time constant, $L/R$, long enough for element 3 to become fully resistive, permitting current $I_1$ to flow through the fully nucleated resistance of output element 3 giving the desired output pulse without immediate shunting thereof. The time constant should be rapid enough, however, to allow current from the source to be diverted to inductance 6, before excessive heating occurs. It can be stated as a general exemplary prerequisite for operation of this circuit that the time constant $L/R$, should be much greater than the time for the output element to heat from the ambient or bath operating temperature to its critical temperature, for example, on the order of $10^2$ greater.

The output voltage drop across the output element 3 at the time when the output element 3 goes normal is given by the following expression:

$$e = iR_3 + L_3(di/dt)$$

where $i$ is the current through the branch including output element 3, $R_3$ is the resistance of the completely resistive output element 3, $L_3$ is the inductance of element 3 and $di/dt$ is the rate of change of current with respect to time (as the current tends to shift from the branch including output element 3 to a branch including inductance 6).

If the time required for the output element to reach its maximum resistance is short with respect to the time for current $i$ to shift to inductance 6 and time $t=0$ is taken as the time the output element reaches maximum resistance, then $$i = I_0 e - (tR_{total}/L_{total})$$

and therefore $$(di/dt) = -I_0(R_{total}/L_{total})$$

$R_{total}$ is all the resistance around the loop, $I_0$ is the current at the time, $t=0$, when the resistance of the output element first reaches its maximum value ($R_3$), and $L_{total}$ is all the inductance around the loop including mostly inductance 6. Then, at $t=0$, $$e = I_0 R_3 - I_0 R_{total}(L_3/L_{total})$$

Therefore, the inductance 6 is preferred large compared to the total inductance in the circuit to increase the output voltage $e$. If the inductance of the branch including 6 is not large compared to the rest of the circuit, the magnitude of the output voltage, $e$, will be greatly reduced or shunted out to the point of being practically eliminated. This is an alternative way of again stating the aforementioned time constant $L/R$ should be large to permit a large output voltage to develop, consonant again with the requirement that the time constant $L/R$, be small enough to prevent the heat destruction of output element 3.

When the output element becomes resistive and the current starts to divert to inductance 6, the output element cools down according to its thermal time constant. Output signal times should therefore preferably be longer spaced than the thermal time constant apart. Since $I_1$ is concluded before the output element has time to again become superconducting no persistent current will be stored in the loop formed by the paths of $I_4$ and $I_3$.

When a current $I_2$ is present, the gate 2 is rendered resistive and nearly all the current from the current source 5 will initially flow through the branch including inductance 6 because it has zero resistance. Therefore in the presence of $I_2$ no output voltage spike V is produced at the output element.

It is observed that inductance 6 in the above device has two functions: first, to supply a shunt path for current $I_1$ after output element 3 has produced an output pulse, thereby preventing the destruction of the output element, and second, to initially cause diversion of current $I_1$ through output element 3 in the absence of $I_2$. It is to be observed then that the current $I_1$ is arranged to rise slowly enough so that no appreciable voltage output V will appear across output element 3 when $I_2$ is present. If $I_1$ rises too sharply, the inductance 6 would prevent diversion of current to inductance 6 at that time and might cause output element 3 to heat up and produce an output voltage even if $I_2$ were present.

Glass plate substrate 1 together with the translation device according to the present invention deposited thereon and other cryogenic circuitry which may be associated therewith may be disposed as at 13 in the apparatus illustrated in FIG. 8, generally referred to as a cryostat. This apparatus is employed to secure to the cryogenic devices the super-cold temperatures necessary for their operation.

In FIG. 8 an insulating container 14 is provided comprising two metallic spheres 15 between which there is some suitable insulation 16. These spheres can be opened along flanges 17 enabling the placement in container 14 of cryogenic circuitry illustrated at 13. These cryogenic devices are connected by wires 18 to conventional circuitry 19 which may include a power supply and devices utilizing the output of the cryogenic devices.

Liquid helium 20 surrounds the cryogenic circuitry represented at 13 for maintaining such circuitry at the desired low operating temperatures. The temperature of liquid helium is a function of the pressure on the helium. For the desired operating temperature of 3.5° K., this pressure is slightly less than atmospheric pressure. Thus, a vacuum arrangement is required. The illustrated vacuum arrangement comprises a vacuum pump 21 that causes air to flow through a conduit 22 from a manostat 23 which is connected by another conduit 24 to the neck of the insulating container 14. The manostat 23 regulates the pressure on the liquid helium 20.

Suitable conditions obtained for the output element's becoming resistive include the condition aforementioned that current through the element not be drawn away before it becomes resistive, and that its surroundings, including the substrate upon which it is deposited and the low temperature cryostat in which it is enclosed, allow the output element to heat up rather than prevent it by drawing the heat too rapidly and continuously away from the output element. That is to say, the conditions for propagation of a resistive nucleus in output element 3 are obtained when for an increase in volume of the nucleus of normal of resistive material, the increase in Joule heat produced thereby is greater than the increase in heat loss.

The heat generated by the resitive film may be given by the following expression:

$$Q_{gen} = I^2 R$$

which is a function of the current through the output element and the temperature of the output element. R is output element resistance, and is dependent on these factors.

Heat loss to the cryostat through the substrate on the other hand may be expressed by:

$$Q_{loss} = FA(T - T_0)$$

where T is temperature, $T_O$ is initial operating temperature of the bath, F is the heat loss coefficient to helium in watts per sq. centimeter-degrees K., and A is the area over which the heat loss occurs.

Proper "snapping" will occur when the $$\left(\frac{\partial I^2 R}{\partial T}\right)_I \geq FA$$

It has been found that a thin film output element formed of lead upon a glass substrate in liquid helium cryostat provides the desired rate of heat loss characteristics for very satisfactory operation of the device according to the present invention. This output element 3 has a comparatively large resistance and a smaller critical current than the rest of the immediate circuit in which it is included. In addition, a lead film element of small cross sectional dimension will permit a relatively larger current $I_1$ from the current source to be passed therethrough than would many other output element constructions commensurate with the requirements of a large resistance and a somewhat lower critical current than the rest of the circuit. This larger critical current materailly increases the desired IR voltage drop across the output element.

The critical current for a superconductor may be expressed as follows:

$$I_c = Kdw (T_c - T_o)^n$$

where $w$ is the film width, $T_o$ is the bath temperature (providing that $(T_c - T_o)$ is much less than $T_c$). K depends somewhat on heat treatment of the output element and whether a metallic shield plane is employed. $n$ is about one for glass substrate.

The critical temperature factor, $T_c$, for lead is 7.22° K., a temperature considerably larger than most other superconducting materials. However, a lead film of small cross-sectional dimensions ($d$ and $w$ in the formula) may be made to have not only a high resistance but a critical current slightly smaller than the other conductors in the same circuit even though they also be formed of lead material. The critical current for the output element may thus be adjusted to a value just under the critical current for any other circuit element in series with the current supply, but still high enough to develop a reasonable IR drop across the output element. Elemental tin, for example, would not be as good a choice as lead because a tin output element of such dimensions as would render it high in resistance would display a critical current materially less than for lead. This is because its critical temperature, $T_c$, is much lower and therefore its $I_c$, in accordance with the above formula. Many other superconducting matermials adapted to supply a relatively high R for a voltage drop thereacross would develop this R at too low a current, I, to produce a desirabily high IR output drop.

In FIG. 4, illustrating an alternative embodiment of the present invention, the output element 3 is transferred to the branch of the circuit including inductance 6. The construction and operation of the device is otherwise essentially the same. One advantage of the FIG. 4 configuration, however, is that an output voltage V will be produced across the output element 3 in the presence rather than in the absence of input $I_2$ introduced at terminals 9. Thus with no $I_2$ signal present, the current $I_1$ from voltage source 5 will divide in accordance with the inverse ratio of inductances of the two branches and therefore will flow for the most part as $I_4$ through gate 2 and back to the current source. However, if a current $I_2$ traverses grid 7 across gate 2 and thereby renders gate 2 resistive, $I_1$ will be forced to flow through the branch including inductance 6 and output element 3 and this current is again arranged to have a value in excess of the critical current of output element 3, so that an output voltage spike, V, is produced. The danger of inadvertently exceeding the critical current of output element 3 at the initiation of $I_1$ is lessened by including inductance 6 and output element 3 in the same branch according to this circuit.

The various currents present in the FIG. 4 device as a function of time are illustrated in FIG. 5, wherein an input current $I_2$ is introduced after the start of current $I_1$, from the current source for illustrating the two states of circuit operation. The waveforms respectively represent $I_1$, the current from current source 5; $I_2$, the input signal; $I_3$, the current through the branch including inductance 6 and output element 3; $I_4$, the current through gate 2; V, the output voltage across element 3; and T, the temperature of output element 3. It is noted that when the current $I_1$ begins flowing from the current source, it divides in inverse proportion to the inductance of the two circuit branches, most of the current initially flowing, therefore, through the gate 2 as $I_4$. Then when an input current $I_2$ is introduced, gate 2 becomes resistive with a resistance which may be represented as $r$. The current $I_1$ then starts to transfer to the branch including inductance 6 and output element 3, with a time constant $L/r$. As $I_3$ increases, the critical current $I_c$ of output element 3 is exceeded and at a slightly larger current the output element 3 rapidly nucleates or snaps into a resistive condition resulting in a large output voltage spike V produced across terminals 10. At this point, before output element 3 heats up to a self-destruction temperature, the current from current source 5 begins to transfer back to the branch including gate 2 since the latter exhibits a materially smaller normal resistance than the output element 3. As the current transfer with the time constant equal to $L/R$, where L is the inductance 6 and R is the resistance of output element 3 for the most part, the output element 3 begins to cool down according to its thermal time constant and should be allowed to cool below its critical temperature before another input signal $I_2$ is received. Inductance 6 is again chosen to be as large as possible for minimum shunting of output voltage V by gate 2, in keeping with the requirement that the time constant $L/R$ be small enough so that the output element 3 will not heat excessively. The time constant $L/R$ should therefore again be materially longer than the time required for output element 3 to heat up from operating temperature to the temperature for maximum resistance.

The inductance 6 in the FIG. 4 device may be thought of as storing the energy for the output pulse V, this energy being dissipated in the output element to produce the output spike. In the FIG. 4 device no stored persistent current remains in the loop when $I_1$ is turned off inasmuch as $I_1$ is turned off before the temperature of the output element drops to its critical temperature. Alternatively, $I_2$ could be continued long enough to destroy any circulating current remaining after $I_1$ is terminated.

It is again understood that the device is suitably refrigerated, for example, by means of FIG. 8 apparatus.

Another embodiment of the invention is illustrated schematically in FIG. 6. This configuration employs substantially the same similarly numbered elements as the other embodiments of the invention but has the additional provision of a variable bias control allowing flexibility of current choice and design. A circuit branch 14 including an output element 3 is parallel with circuit branch 15 including an inductance 6 and the parallel combination is supplied with relatively constant current $I_4$ from a current source (not shown). A second parallel combination comprises a branch 16 including a thin film gate 2 and a branch 13 inductively related to branch 14 of the previous parallel combination. Branches 13 and 16 are supplied in parallel with an adjustable current $I_1$ from a preselected source of relatively constant current (not shown). A narrow grid element 7 is disposed transversely across gate element 2 to provide a switching action thereto; that is, as in the previous embodiments, a current $I_2$ is selected to flow through grid element 7 such that the magnetic field produced around grid 7 by this current renders the gate 2 thereunder resistive or non-superconducting. As in the previous embodiments, the entire circuitry and whatever other cryogenic equipment may be associated therewith is suitably refrigerated to a temperature in the superconducting region for the conducting materials involved.

The inductance 6 should again be large enough to have a time constant in combination with the normal resistance of output element 3 which is much larger than the time required for output element 3 to heat up from ambient operating temperature to the temperature at which it is completely resistive. However, the value of inductance 6 should be such that the time constant thereof in combination with the normal resistance of output element 3 will be short enough to allow transfer of current $I_4$ to branch 15 including inductance 6 when output element 3 becomes completely resistive and before destructive overheating occurs in output element 3.

Circuit branch 13 is inductively related to circuit branch 14 at any point along the respective lengths of said branches and in any manner desired. The desired inductive coupling may be achieved for example as shown by disposing the two branches in close parallel physical relation to one another over a considerable portion of their respective lengths, and the parallel portion of branch 14 may, but need not, include the output element 3.

Operation of the FIG. 6 device will be considered in connection with the chart of waveforms illustrated in FIG. 7 wherein the following are plotted as a function of time: Current $I_1$, the current delivered to the parallel combination of circuit branches 13 and 16; current $I_2$, the input current applied to terminals 9 of grid element 7; current $I_3$, flowing in circuit branch 13; current $I_4$, delivered to the parallel combination of circuit branches 14 and 15; the current $I_5$, through circuit branch 14 including output element 3; the output voltage drop V developed at terminals 10 across output element 3; and the termperature, T, of output element 3.

The FIG. 7 chart of waveforms illustrates two successive occurrences of applied current $I_1$ and two successive occurrences of input current $I_2$ beginning in each instance after the application of $I_1$ for purposes of illustration. At the first occurrence of $I_1$ on the waveform chart, no current $I_4$ is applied to the parallel combination of branches 14 and 15, whereas, at the second $I_1$ occurrence time shown, a current pulse $I_4$ is applied to the parallel combination of branches 14 and 15. This current $I_4$ is desirably attained from a source of relatively constant current but one whose constant current output may be adjusted to any value from zero to nearly the critical current of output element 3. The current $I_4$ acts as a bias quantity for determining the amount of additional induced current required in branch 14 for rendering output element 3 resistive. The value of the current $I_1$ may then be allowed to vary inversely with the value of $I_4$.

When the input $I_2$ is applied to grid 7 traversing gate 2, the gate 2 becomes resistive and the current $I_1$, previously divided between branches 13 and 16 will nearly all flow in superconducting branch 13 as $I_3$. As this current increases it will induce a current in branch 14 which when added to the current already flowing there is adjusted to be sufficient for rendering output element 3 resistive. When output element 3 becomes resistive, it tends to snap or the resistive area tends to nucleate very rapidly so that its resistance immediately rises to a high value. The current flowing therein therefore produces a high voltage output spike, V, across terminals 10.

Inductance 6 again should desirably have a relatively high value compared with the other branch so that it will not attenuate the output signal across terminal 10; that is it wil lallow the film 3 to heat up to its completely resistive state before diverting current therefrom. However, the circuit should have a time constant which will insure current diversion to inductance 6 before destructive heating occurs in output element 3.

Various departures may be made from the embodiments as particularly described. For example, although a lead film output element is very desirable, other output element shapes and sizes and other superconducting materials meeting stated requirements may be employed. The relative output element dimensions would then be dependent upon the resistivity of the material so that the normal resistance is maintained reasonably high and preferably by a factor of $10^2$ greater than the other conductors in the circuitry. The other conductors in series with the current source must also exhibit a higher critical current than the output element so that the output element first becomes resistive. Whereas the other circuit conductors should have the higher critical current, the critical current of the output element and the current flowing therethrough during heat up of the output element should desirably not be inconsiderable. Although inductive diversionary circuit means is illustrated for concluding current through the output element before excessive heating results, other means, for example, rapid switching, can be employed to terminate or reduce this constant current before the element burns out.

Current sources or constant current sources are generally referred to in connection with the above embodiments, but it will be appreciated that many types of electric power sources will act as a source of constant current as viewed from substantially zero or small resistance superconducting circuitry. As a matter of fact, the dropping resistance frequently added in series with cryogenic circuitry to protect the ordinary power supply enhances the power circuit's resemblance to a constant current source.

Deposited conductors are illustrated in various advantageous embodiments herein set forth but it should be apparent that the invention is not limited thereto. Superconductors in the form of cylindrical wires, for example, having the desired properties, may be substituted.

Furthermore the invention is not restricted to a thin film cryogenic gate used as an input device. Other means for gating or controlling a current in response to the input signal may be employed.

While we have shown and described several embodiments of our invention, it will be apparent to those skilled in the art that many other changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A translation device comprising a pair of superconductive current carrying paths, means applying current to said paths in parallel, superconducting output element serially interposed in one of said paths having a lower critical current than the rest of said paths and capable of heating up rapidly in the presence of a current greater than critical current therethrough, one of said paths having a materially higher inductance than the other for initially determining current division between said paths in the absence of an input signal and having a time constant for maintaining current from said means in said output element for a predetermined time in the presence of an input signal, and magnetic gating means cooperating with one of said paths for switching the current flow therein in response to an input signal condition to raise the current through said output element to higher than its critical current.

2. A translation device comprising a pair of parallel superconductive current carrying paths, means supplying current to said paths in parallel, a superconducting output element serially interposed in one of said paths having a lower critical current than the rest of said paths and having a high normal resistance, a first of said paths having a materially higher inductance than a second of said paths for initially diverting the current flow through the second of said paths in the absence of an input signal and which has a time constant for maintaining current from said means in said output element for a predetermined time in the presence of an input signal, cryotron gate means controlling the current in the other of said paths to divert the current flow back to the first of said paths in response to an input signal, and refrigeration and substrate means supporting said element having sufficient cooling capacity for normally rendering said element superconducting but of capacity less than would immediately remove heat from said element with more than critical current flowing therethrough so that said element may heat up with an attendant increase in its resistance.

3. A translation device comprising a pair of superconductive current carrying paths in parallel, a superconducting output device serially interposed in one of said paths having a lower critical current than the rest of said paths and having a higher normal resistance than the rest of said paths, a first of said paths having a materially higher inductance than the second of said paths for initially diverting the applied current flow through the second of said paths in the absence of an input signal and having a time constant greater than the time required for said output device to reach a selected maximum output temperature, and a magnetic gating device associated with the other of said paths for diverting current flow back to the first of said paths in response to an input signal applied to said gating device.

4. A translation device comprising a pair of superconductive current carrying paths, a substantially constant current source supplying current to said paths in parallel, one of said paths including a thin film output element constructed of a film of such thinness relative to the rest of said paths to exhibit a lower critical current than the rest of said paths and also to exhibit a high normal resistance when not superconducting, a gating device including a grid and a gate having its gate included in said one of said paths and an inductance included in the other of said paths which acts to maintain said current in the output element for a predetermined time to produce an output spike.

5. A device as set forth in claim 4 wherein said gating device comprises a thin film gate serially included in said first path and constructed to have a higher critical current than said output element, and a narrow insulated grid element deposited transversely across said film gate.

6. The apparatus as set forth in claim 4 wherein said output device film is composed of lead.

7. A translation device comprising a pair of superconductive current carrying paths, a source of substantially constant current supplying said paths in parallel, a gating device serially included in the first of said paths, an inductance included in a second of said paths which acts to maintain its current for a predetermined time, and a thin film output element also serially included in said second path which is constructed to be very thin relative to the rest of said paths to exhibit a smaller critical current than the rest of said paths and to exhibit a high normal resistance.

8. The device as set forth in claim 7 wherein said gating device comprises a thin film serially interposed in said path and constructed to exhibit a lower critical current than the rest of said paths except for said output element, and an insulated grid member deposited transversely across the film of said gating device.

9. A device as set forth in claim 7 wherein said output element is formed of lead.

10. A translation device comprising a pair of superconductive current carrying paths, a source of substantially constant current supplying said paths in parallel, an inductance included in one of said paths, a thin film output element included in the other of said paths constructed to be very thin to exhibit a smaller critical current than the rest of said paths and to exhibit a high normal resistance, and means inductively related to the second of said paths for inducing an added current therein which when taken in combination with the current from said constant current source flowing therein is in excess of the critical current of said thin film output element.

11. The device as set forth in claim 10 wherein said means inductively related to the second of said paths is supplied with a source of substantially constant current connected thereacross, and a cryogenic electronic switching device shunting said source of current.

12. The apparatus as set forth in claim 11 wherein said cryogenic electronic switching device comprises a thin superconducting film shunted across said source of current and an insulated grid element disposed transversely thereacross.

13. The device as set forth in claim 10 wherein said thin film output element is formed of lead.

14. A translation device comprising a pair of superconductive current paths, a superconducting output element in one of said paths with such thinness relative to the rest of said paths to exhibit a lower critical current than the rest of said paths and to exhibit a higher normal resistance, a first of said paths having a materially higher inductance than the second of said paths for initially diverting the current flow through the second of said paths in the obsence of an input signal and for maintaining for a predetermined time the current in the output element in the presence of an input signal, and cryotron means cooperating with the second of said paths for altering the current flow therein in response to an input signal.

15. A translation device comprising a pair of superconductive current paths, a superconducting output element in one of said paths composed of a material normally exhibiting at least as high a critical current as the rest of said paths but proportioned of such thinness relative to the rest of said paths to exhibit a lower critical current than the rest of said paths and to exhibit a higher normal resistance, a first of said paths having a materially higher inductance than the second of said paths for initially diverting the current flow through the second of said paths in the absence of an input signal, and means cooperating with the second of said paths for altering the current flow therein in response to an input signal.

References Cited by the Examiner
UNITED STATES PATENTS

| | | | |
|---|---|---|---|
| 2,913,881 | 11/1959 | Garwin | 307—88.5 |
| 2,973,441 | 2/1961 | Courtney-Pratt | 328—88.5 |
| 2,989,714 | 6/1961 | Park et al. | 307—88.5 |
| 3,022,468 | 2/1962 | Rosenberger | 307—88.5 |
| 3,047,743 | 7/1962 | Brenneman | 340—173.1 |
| 3,056,889 | 10/1962 | Nyberg | 307—88.5 |
| 3,065,359 | 11/1962 | Mackay | 307—88.5 |

OTHER REFERENCES

Publication I, Communications from the Physical Laboratory of The University of Leiden, vol. 139(f) 1949, pp. 65–71.

ARTHUR GAUSS, *Primary Examiner.*

HERMAN KARL SAALBACH, *Examiner.*

H. A. GRIFFIN, B. P. DAVIS, *Assistant Examiners.*